(12) United States Patent
Kim et al.

(10) Patent No.: US 6,548,204 B1
(45) Date of Patent: Apr. 15, 2003

(54) SEALED BATTERY

(75) Inventors: Jin-kyung Kim, Chungcheongnam-do (KR); Jeong-soon Shin, Chungcheongnam-do (KR); Ki-woong Jang, Chungcheongnam-do (KR)

(73) Assignee: Samsung SDI Co., Ltd., Kyungki-do (KR)

( * ) Notice: Subject to any disclaimer, the term of this patent is extended or adjusted under 35 U.S.C. 154(b) by 39 days.

(21) Appl. No.: 09/711,540

(22) Filed: Nov. 14, 2000

(30) Foreign Application Priority Data

Dec. 8, 1999 (KR) .............................................. 99-55685

(51) Int. Cl.[7] .............................................. H01M 2/26
(52) U.S. Cl. ........................ 429/94; 429/161; 429/211
(58) Field of Search ............................ 429/94, 161, 211

(56) References Cited

U.S. PATENT DOCUMENTS

| | | | | |
|---|---|---|---|---|
| 4,000,351 A | * | 12/1976 | Hug et al. ..................... | 429/94 |
| 4,664,989 A | * | 5/1987 | Johnson ........................ | 429/94 |
| 4,929,519 A | * | 5/1990 | Catotti ......................... | 429/94 |
| 5,508,122 A | * | 4/1996 | Narukawa et al. ............. | 429/94 |
| 5,843,594 A | * | 12/1998 | Cheong et al. ................ | 429/94 |
| 6,007,938 A | * | 12/1999 | Blancheton ................... | 429/94 |
| 6,329,097 B1 | * | 12/2001 | Kim ............................ | 429/94 |

* cited by examiner

*Primary Examiner*—Stephen Kalafut
(74) *Attorney, Agent, or Firm*—Leydig, Voit & Mayer, Ltd.

(57) ABSTRACT

A sealed battery includes a can having an opening, a rolled electrode assembly inserted into the can, and a cap assembly sealing the opening. The rolled electrode assembly has first and second electrodes and a porous separator disposed between the first and second electrodes. The first electrode has a first base plate and a first active material deposited on the first base plate, and the second electrode has a second base plate and a second active material deposited on the second base plate. Central turns are disposed around an imaginary central axis of the rolled electrode assembly and support the rolled electrode assembly. The central turns include at least 1.5 turns of one of the first and second base plate and the porous separator.

15 Claims, 3 Drawing Sheets

SEALED BATTERY

BACKGROUND OF THE INVENTION

1. Field of the Invention

The present invention relates to a secondary sealed battery which can prevent overheating and short circuit at a roll center of a rolled electrode assembly by forming a mandrel along a central axis of the battery.

2. Description of the Related Art

Generally, a sealed battery has the drawback that it may explode when internal pressure is increased above an allowable level as a result of overcharging or abnormal operation thereof.

An electrode assembly typically comprises positive and negative electrode strips and a porous separator strip disposed between the positive and negative electrodes and rolled together.

The porous separator is designed, so that when an internal temperature of the battery is increased above an allowable level, to interrupt ion movement between the positive and negative electrodes by blocking the holes thereof, thereby preventing further electrochemical reaction to enhance the safety of the battery.

However, in the conventional sealed battery, since the rolled electrode assembly is highly heated at its center, particularly in the vicinity of an electrode tap attached to an innermost turn of a base substrate of the positive electrode, a center portion of the separator may lose its insulating function, causing a short circuit between the tap and a base plate of the negative electrode.

As a result, an electrochemical reaction between the positive and negative electrodes quickly occurs, causing a chemical melt down reaction such as decompositions of negative active material, electrolyte, and positive active material. This may be a fatal problem such as the explosion of the battery.

SUMMARY OF THE INVENTION

Therefore, the present invention has been made in an effort to solve the above described problems.

It is an objective of the present invention to provide a sealed battery which can prevent overheating and short circuiting at a roll center of a rolled electrode assembly by forming a mandrel along a central axis of the battery.

To achieve the above objective, the present invention provides a sealed battery comprising a can having a top opening; a rolled electrode assembly inserted into the can, the rolled electrode assembly having first and second electrodes and a porous separator disposed between the first and second electrodes, the first electrodes having a first base plate and a first active material deposited on the first base plate, and the second electrode having a second base plate and a second active material deposited on the second base plate; a cap assembly for sealing the top opening of the can; and a central turns disposed around an imaginary central axis of the rolled electrode assembly to support the rolled electrode assembly, the central turns being formed by at least 1.5 turns of one of the first and second base plates and the porous separator.

The sealed battery may further comprise an electrode tap connecting an innermost turn of the central turns to the cap assembly.

Preferably, the central turns are formed by at least 1.5 turns of the first base plate which is a positive base plate.

Turns of the second base plate starts at a point away from a point, where the tap is attached on the inner most turn of the first base plate, by 90–270°. The second base plate comprises an outermost turn contacting directly the can.

Preferably, the central turns are formed of less than 4 turns. The first electrode is a positive electrode, and the second electrode is a negative electrode.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF PREFERRED EMBODIMENTS

Reference will now be made in detail to the present preferred embodiment of the invention, an example of which is illustrated in the accompanying drawing(s). Wherever possible, the same reference numbers are used throughout the drawings to refer to the same or like parts.

Figure 1:
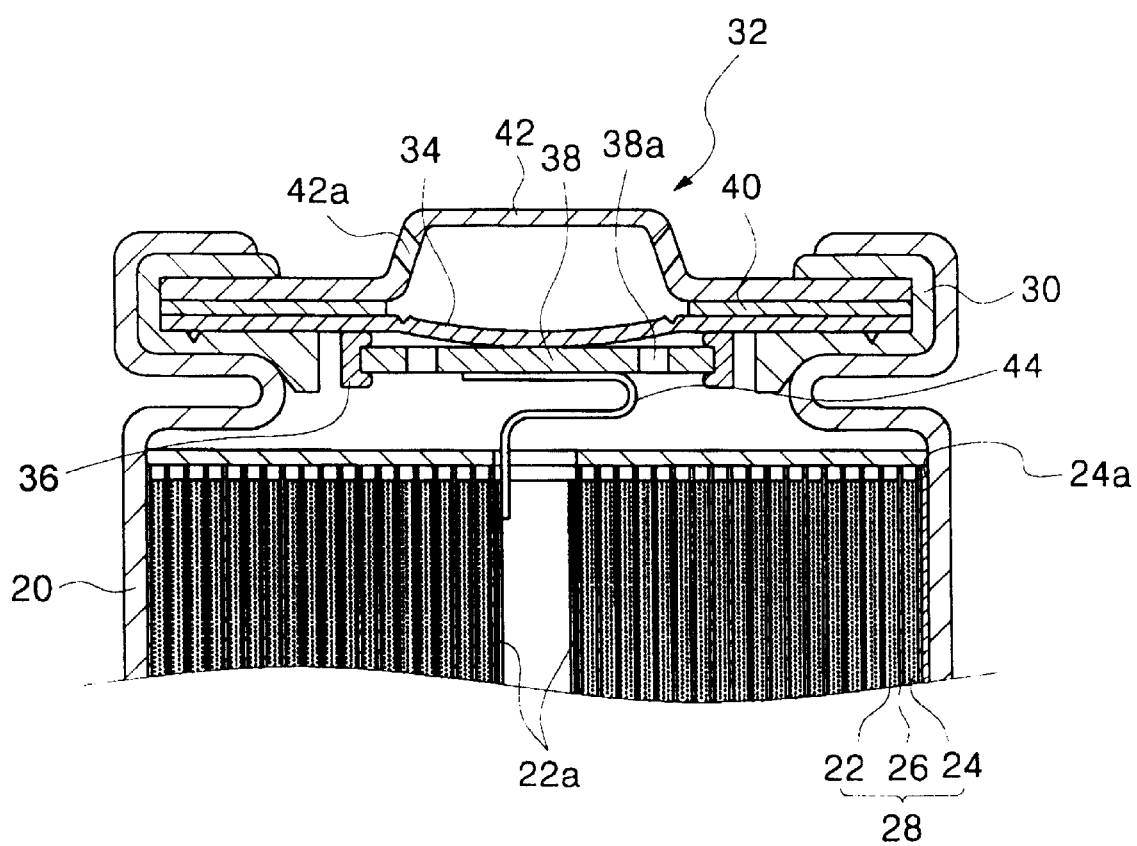
FIG. 1 is a longitudinal sectional view of a sealed battery according to a first embodiment of the present invention.
Figure 2:
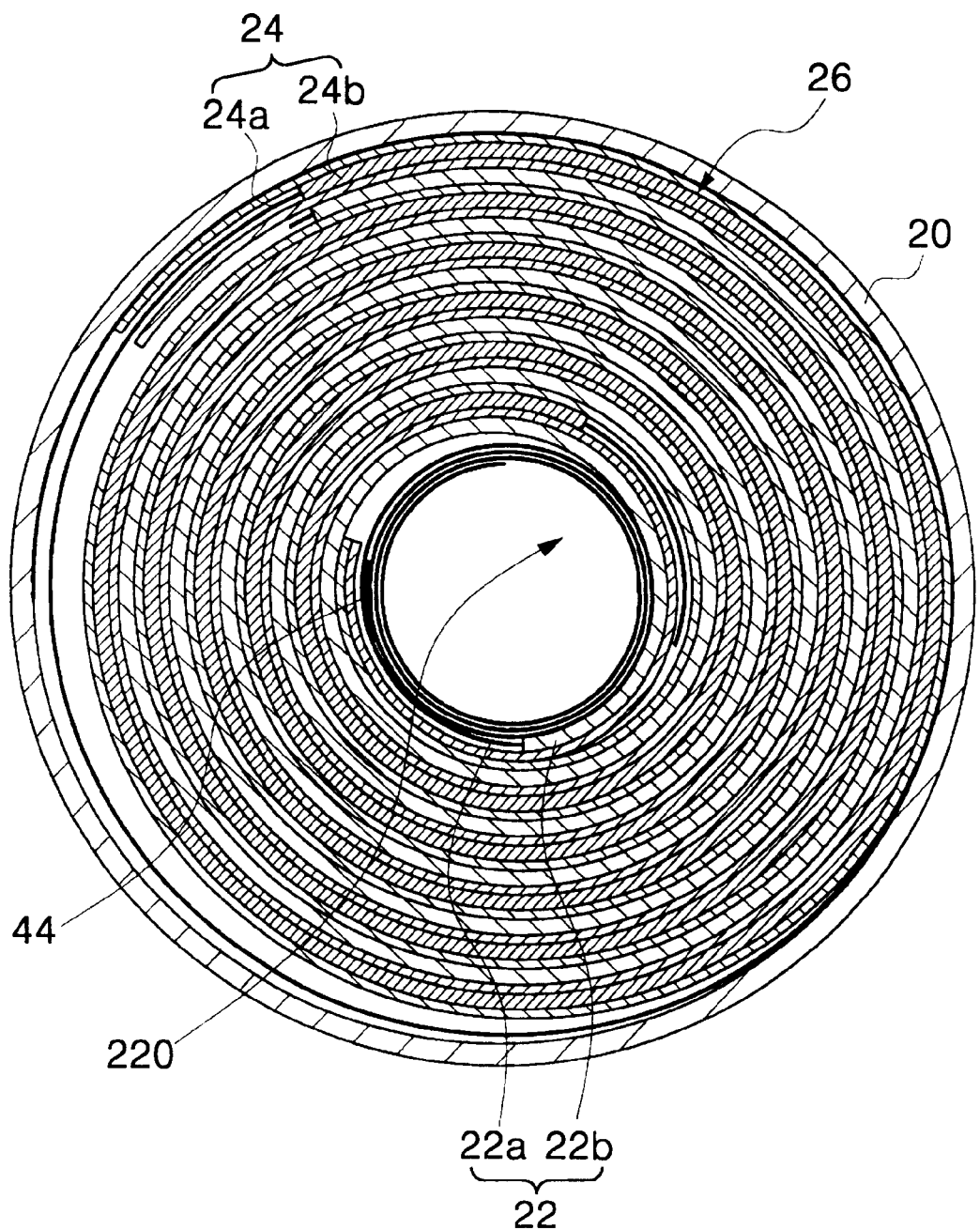
FIG. 2 is a cross sectional view of FIG. 1.

FIG. 1 shows a sealed battery according to a first embodiment of the present invention and FIG. 2 shows a sectional view of FIG. 1.

As shown in the drawings, a sealed battery comprises a cylindrical can 20 in which a rolled electrode assembly 28 having positive and negative electrodes 22 and 24 and a porous separator 26 disposed between the positive and negative electrodes 22 and 24 is inserted together with electrolyte. An opening of the cylindrical can 20 is airtightly sealed by a cap assembly 32 with a gasket 30 disposed therebetween.

The cap assembly 32 comprises a deformable plate 34 which is deformed by internal pressure of the battery, and a fixing plate 38 provided with an air hole 38a and disposed under the deformable plate 34 with a supporting insulating member 36 disposed therebetween. A current control member 40 is disposed on the deformable plate 34 and a cap cover 42 is mounted on the current control member 40. The cap cover 42 is also provided with an air hole 42a.

The properties of the positive and negative electrodes 22 and 24 are determined according to types of base plates 22a and 24a and active materials 22b and 24b. For example, the base plate 22a of the positive electrode 22 is generally made of Al, on which lithium-transition metal oxide is deposited as the active material 22b, and the base plate 24a of the negative electrode 24 is made of Cu, on which carbon or a carbon complex is deposited as the active material 24b.

Central turns 220 of the rolled electrode assembly 28 are formed around an imaginary central axis of the rolled electrode assembly 28 by, for example, a couple of turns of the base plate 22a which are not provided with the active material. Attached on an innermost turn of the base plate 22a is one end of an electrode tap 44, the other end of which is attached on the fixing plate 38. Preferably, the number of central turns of the rolled electrode assembly 28 is about 1.5–4.

In addition, the turns of the base plate 24a of the negative electrode 24 start from a point spaced from the electrode tap 44 by 90–270°. Therefore, the electrode tap 44 and the base plate 24a of the negative electrode 24 are spaced away from each other by at least 90°.

As a result, when the porous separator 26 contracts as the temperature is increased above a shut-down temperature, the possibility of short-circuit between the electrode tap 44 and the base plate 24a of the negative electrode 24 is reduced. A portion of the negative electrode 24 which is closest to the electrode tap 44 is a region where the active material 24b is deposited.

Furthermore, as the number of central turns 220 of the positive base plate 22a is at least 1.5 and the electrode tap 44 is attached to the innermost turn of the base plate 22a, the electrode tap 44 always contacts an identical polarity, minimizing the possibility of a short-circuit. In addition, since the central turns 220 of the positive base plate 22a functions as a mandrel and is made of metal, generated heat can be easily discharged through the central turns 220, suppressing the increase of the temperature.

In addition, more than 0.5 turns of the outermost turn of the negative electrode 24 is not coated with the active material 24b and directly contacts the can 20, realizing an electrical circuit.

Figure 3:
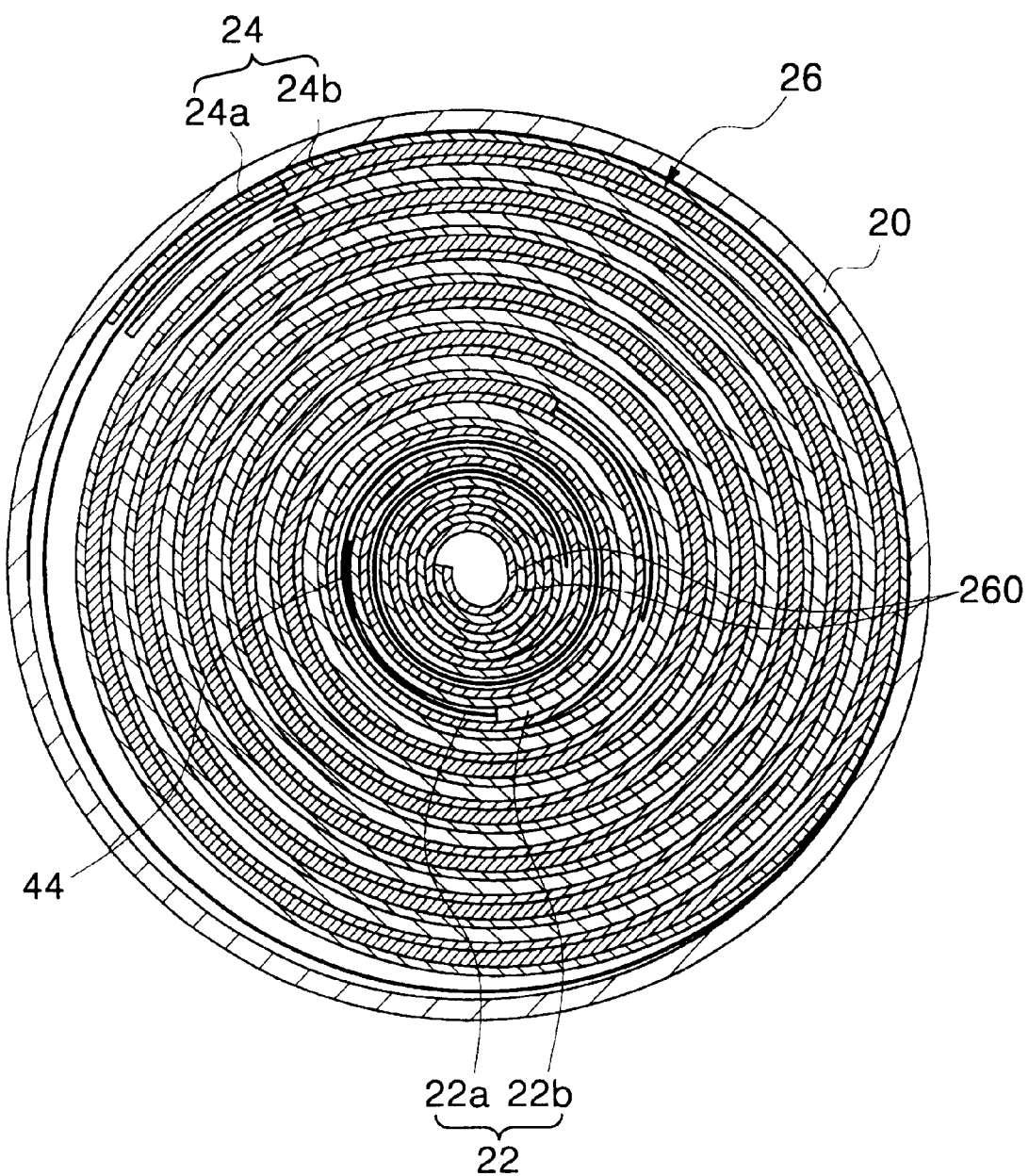
FIG. 3 is a cross sectional view of a sealed battery according to a second embodiment of the present invention.

FIG. 3 shows a sealed battery, similar to FIG. 2, according to a second embodiment of the present invention.

A sealed battery of this embodiment is identical to that of the first embodiment except that central turns 260 of a rolled electrode assembly 28 is formed by turns of a porous separator 26 without any electrode. The number of central turns 260 of a porous separator 26 is 2–4.

The central turns 260 of the porous separator 26 function as a mandrel while supporting the rolled electrode assembly 28. In addition, when the internal temperature of the battery is increased above an allowable level, the central turns 260 of the porous separator 26 contract to discharge the inner heat, thereby suppressing a quick increase of the internal temperature.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A sealed battery comprising:
   a can having an opening;
   a rolled electrode assembly inserted into the can, the rolled electrode assembly having first and second electrodes and a porous separator disposed between the first and second electrodes, the first electrode having a first base plate and a first active material deposited on the first base plate, and the second electrode having a second base plate and a second active material deposited on the second base plate;
   a cap assembly sealing the opening of the can, wherein central turns disposed around an imaginary central axis of the rolled electrode assembly support the rolled electrode assembly, the central turns including at least 1.5 turns of the first base plate; and
   an electrode tap connecting an innermost turn to the cap assembly, wherein turns of the second base plate start at a first point, spaced from a second point where the electrode tap is attached to the innermost turn of the first base plate, by 90–270°.

2. The sealed battery of claim 1 wherein the second base plate comprises an outermost turn directly contacting the can.

3. The sealed battery of claim 1 wherein the central turns include fewer than 4 turns.

4. The sealed battery of claim 1 wherein the first electrode is a positive electrode.

5. The sealed battery of claim 1 wherein the second electrode is a negative electrode.

6. A sealed battery comprising:
   a can having an opening;
   a rolled electrode assembly inserted into the can, the rolled electrode assembly having first and second electrodes and a porous separator disposed between the first and second electrodes, the first electrode having a first base plate and a first active material deposited on the first base plate, and the second electrode having a second base plate and a second active material deposited on the second base plate;
   a cap assembly sealing the opening of the can, wherein central turns disposed around an imaginary central axis of the rolled electrode assembly support the rolled electrode assembly, the central turns including at least 1.5 turns of the second base plate; and
   an electrode tap connecting an innermost turn to the cap assembly, wherein turns of the second base plate start at a first point, spaced from a second point where the electrode tap is attached to the innermost turn of the first base plate, by 90–270°.

7. The sealed battery of claim 6 wherein the second base plate comprises an outermost turn directly contacting the can.

8. The sealed battery of claim 6 wherein the central turns include fewer than 4 turns.

9. The sealed battery of claim 6 wherein the first electrode is a positive electrode.

10. The sealed battery of claim 6 wherein the second electrode is a negative electrode.

11. A sealed battery comprising:
    a can having an opening;
    a rolled electrode assembly inserted into the can, the rolled electrode assembly having first and second electrodes and a porous separator disposed between the first and second electrodes, the first electrode having a first base plate and a first active material deposited on the first base plate, and the second electrode having a second base plate and a second active material deposited on the second base plate;
    a cap assembly sealing the opening of the can, wherein central turns disposed around an imaginary central axis of the rolled electrode assembly support the rolled electrode assembly, the central turns including at least 1.5 turns of the porous separator; and
    an electrode tap connecting an innermost turn to the cap assembly, wherein turns of the second base plate start at a first point, spaced from a second point where the electrode tap is attached to the innermost turn of the first base plate, by 90–270°.

12. The sealed battery of claim 11 wherein the second base plate comprises an outermost turn directly contacting the can.

13. The sealed battery of claim 11 wherein the central turns include fewer than 4 turns.

14. The sealed battery of claim 11 wherein the first electrode is a positive electrode.

15. The sealed battery of claim 11 wherein the second electrode is a negative electrode.

* * * * *

(12) EX PARTE REEXAMINATION CERTIFICATE (9217th)
United States Patent
Kim et al.

(10) Number: US 6,548,204 C1
(45) Certificate Issued: Aug. 21, 2012

(54) SEALED BATTERY

(75) Inventors: Jin-kyung Kim, Chungcheongnam-do (KR); Jeong-soon Shin, Chungcheongnam-do (KR); Ki-woong Jang, Chungcheongnam-do (KR)

(73) Assignee: Samsung SDI Co., Ltd., Paldal-Gu, Suwon, Kyungki-do (KR)

Reexamination Request:
No. 90/011,227, Oct. 14, 2010

Reexamination Certificate for:
Patent No.: 6,548,204
Issued: Apr. 15, 2003
Appl. No.: 09/711,540
Filed: Nov. 14, 2000

(30) Foreign Application Priority Data

Dec. 8, 1999  (KR) ............................................. 99-55685

(51) Int. Cl.
*H01M 2/26* (2006.01)

(52) U.S. Cl. ........................... 429/94; 429/161; 429/211

(58) Field of Classification Search .................... None
See application file for complete search history.

(56) References Cited

To view the complete listing of prior art documents cited during the proceeding for Reexamination Control Number 90/011,227, please refer to the USPTO's public Patent Application Information Retrieval (PAIR) system under the Display References tab.

*Primary Examiner* — Timothy Speer

(57) ABSTRACT

A sealed battery includes a can having an opening, a rolled electrode assembly inserted into the can, and a cap assembly sealing the opening. The rolled electrode assembly has first and second electrodes and a porous separator disposed between the first and second electrodes. The first electrode has a first base plate and a first active material deposited on the first base plate, and the second electrode has a second base plate and a second active material deposited on the second base plate. Central turns are disposed around an imaginary central axis of the rolled electrode assembly and support the rolled electrode assembly. The central turns include at least 1.5 turns of one of the first and second base plate and the porous separator.

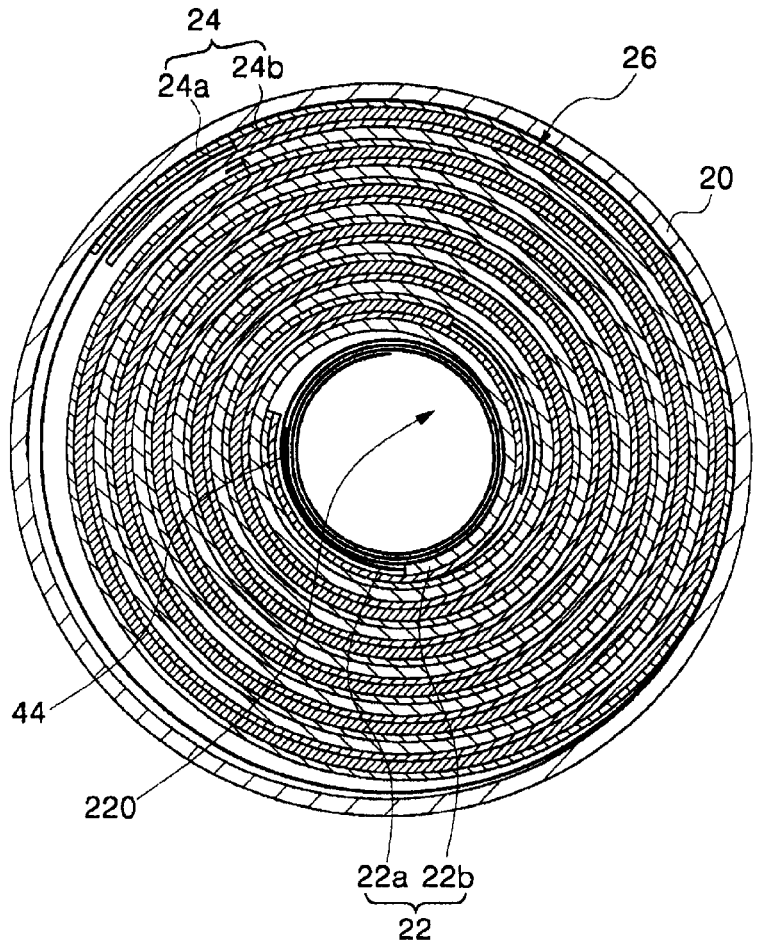

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1, 6 and 11 is confirmed.

Claims 2-5, 7-10 and 12-15 were not reexamined.

* * * * *